(12) United States Patent
Steinmaier et al.

(10) Patent No.: US 7,603,394 B2
(45) Date of Patent: Oct. 13, 2009

(54) CLIENT-SERVER SYSTEM, A GENERATOR UNIT AND A METHOD TO CUSTOMIZE A USER APPLICATION

(75) Inventors: Carola Steinmaier, Dossenhelm (DE); Bernard Brinkmöller, Wiesloch (DE)

(73) Assignee: SAP AG, Walldorf (DE)

( * ) Notice: Subject to any disclaimer, the term of this patent is extended or adjusted under 35 U.S.C. 154(b) by 304 days.

(21) Appl. No.: 11/016,095

(22) Filed: Dec. 17, 2004

(65) Prior Publication Data
US 2005/0198052 A1    Sep. 8, 2005

(30) Foreign Application Priority Data
Dec. 19, 2003    (EP)    ................... 03029402

(51) Int. Cl.
*G06F 17/30*    (2006.01)
(52) U.S. Cl. .................................... 707/204
(58) Field of Classification Search ................ 709/217; 707/1–10, 100–104.1, 200–206; 715/700, 715/701, 730, 733, 731, 739, 744
See application file for complete search history.

(56) References Cited

U.S. PATENT DOCUMENTS

| 5,701,453 | A |  | 12/1997 | Maloney et al. |
| 5,862,325 | A | * | 1/1999 | Reed et al. ................... 709/201 |
| 6,108,686 | A |  | 8/2000 | Williams, Jr. |
| 6,430,571 | B1 | * | 8/2002 | Doan et al. ............. 707/103 R |
| 6,614,914 | B1 | * | 9/2003 | Rhoads et al. ............... 382/100 |
| 6,625,643 | B1 | * | 9/2003 | Colby et al. ................. 709/217 |
| 6,934,717 | B1 | * | 8/2005 | James ..................... 707/104.1 |
| 6,947,598 | B2 | * | 9/2005 | Yogeshwar et al. ......... 382/232 |
| 2003/0126139 | A1 | * | 7/2003 | Lee et al. ..................... 707/100 |
| 2003/0208505 | A1 | * | 11/2003 | Mullins et al. ............... 707/102 |
| 2005/0144189 | A1 | * | 6/2005 | Edwards et al. ............. 707/102 |
| 2007/0050333 | A1 | * | 3/2007 | Vogler ............................ 707/3 |

FOREIGN PATENT DOCUMENTS

| WO | WO 03/067474 A2 | 8/2003 |
| WO | WO 03/067474 A3 | 8/2003 |

OTHER PUBLICATIONS

European Search Report for EP Application No. EP 03029402—2 pages.

* cited by examiner

*Primary Examiner*—Diane Mizrahi
(74) *Attorney, Agent, or Firm*—Finnegan, Henderson & Farabow, Garrett & Dunner, L.L.P.

(57) ABSTRACT

A method for setting up a customizable client-server system can include custom selecting search data fields from a proposed variety of selectable search data fields in order to create a user interface search mask and/or custom selecting archive fields from a proposed variety of selectable archive fields of an archive database. The method further includes the step of automatically linking the fields selected during custom selection with the respective other one of the two varieties of selectable fields in order to identify and automatically generate a list of corresponding respective fields. This can also include automatically generating an archive index for use in quickly searching the archive database based on the custom selected fields.

21 Claims, 3 Drawing Sheets

CLIENT-SERVER SYSTEM, A GENERATOR UNIT AND A METHOD TO CUSTOMIZE A USER APPLICATION

TECHNICAL FIELD

The present invention relates generally to the field of electronic data processing and digital communications networks, and more particularly to a client-server system, a generator unit and a method to customize a user application.

RELATED APPLICATIONS

Priority is claimed to European Patent Application No. 03 029 402.9, filed Dec. 19, 2003, the content of which is incorporated herein by reference.

BACKGROUND

Today, most computers are linked to other computer systems via a computer network. A computer network is basically a collection of computers that are physically and logically connected together to exchange data or "information." The network may be a local area network (LAN) in which computers are geographically close together and connected by short segments of ethernet or to the same network hub or a wide area network (WAN) in which computers are separated by a considerable distance and are connected by telephone lines or radio waves. Often, networks are configured as so-called client-server networks such that each computer on the network is either a client or a server. Servers are computers or processors dedicated to managing shared resources such as storage of electronic data. Any computer that performs a task at the command of another computer is a server.

FIG. 1 illustrates in a schematic block diagram manner a client-server system 100 with a user interface (UI) (not shown), for example a graphical user interface (GUI). A GUI client 118 typically resides on a personal computer 117. The GUI client 118 represents the so-called GUI engine. A server 112 represents the so-called execution engine. The client 118 and the server 112 are interconnected via a communication line 124 wherein communication is typically based on proprietary protocols. The communication line 124 can be realized in various manners well-known to the person skilled in the art in order to create a LAN, a WAN or larger networks, such as the Internet. User interface commands are interpreted by the GUI client 118 and communicated via a proprietary protocol to the server 112, which communicates with applications 126 via an application programming interface (API) 128 to execute the UI commands and then returns results to the GUI client 118. The results are then rendered on the stream of the personal computer.

In some applications, a client user wants to access archived data that is stored on a database interconnected with the server. If the application is a customizable application in which a user can custom design his (graphical) user interface, consistency and performance problems can occur if the user has designed a search mask with selection fields that are not consistent with an archived index of the archived set of data of the database. Therefore, due to customizing errors and/or inconsistencies the user might experience problems or the archive search might not work at all.

SUMMARY

Consistent with the present invention, a client-server system comprises a server and a client interconnected with the server. The client is set up to use an application that is provided by the server. Further, a database containing a structured set of archive data is interconnected with the server. The system is set up to allow for a customized set-up of the application when the application is used by the client. As one of skill in the art would appreciate, the instructions for such customized set-up can be stored on a computer-readable storage medium, including a memory, but excluding carrier waves.

In one aspect, a generator unit for automatically generating an archive index structure based on the customized set-up of the application as defined via the client is provided so that a search in the structured set of data initiated via the client is performed with the automatically generated archive index structure. This results in the generation of an archive index structure that corresponds exactly to the customized set of selection fields in the application so that inconsistencies between a customized user interface and the archive index structure are eliminated.

It is to be understood that in the context of this invention, the term "archive index structure" defines a structure for a database table and the term "structured set of data" defines the database table generated on the basis of this archive index structure.

In another aspect of the invention, the client-server system is set up to allow for a customized set-up of an archive index structure for performing searches in the database, and a generator unit for automatically generating a customized set-up of the application according to the customized archive index structure is provided, so that a search in the structured set of archived data initiated via the client's automatically generated customized set-up is performed with said archive index structure. In this embodiment, a user selects fields for a customized archive index structure from a proposed variety of selectable archive fields of the archive database, on the basis of which custom design the application set-up, e.g. the user interface, is automatically generated. Again, this provides for an elimination of any inconsistencies between archive index and selection fields on the user interface and results in enhanced performance of the client-server system.

Thus, a two-fold setting up of a customizable client-server system is provided. First, one of the two steps of custom selecting search data fields from a proposed variety of selectable search data fields in order to create a user interface search mask and of custom selecting archive fields from a proposed variety of selectable archive fields of an archive database is executed. Second, upon the step of custom selecting, an automatic linking procedure is performed between (a) the fields selected during said step of custom selecting from one of the two varieties of selectable fields and (b) the whole of the variety of the respective other one of the two varieties of selectable fields in order to identify and automatically generate a list of corresponding respective fields of the other one of the two varieties.

In one possible embodiment, the application is a web-based application.

The invention also covers a computer program with program coding means which are suitable for carrying out a process according to the invention as described above when the computer program is run on a computer.

Further features and embodiments of the invention will become apparent from the description and the accompanying drawings.

It will be understood that the features mentioned above and those described hereinafter can be used not only in the combination specified but also in other combinations or on their own, without departing from the scope of the present invention.

It is to be understood that both the foregoing general description and the following detailed description are exemplary and explanatory only and are not restrictive of the invention, as claimed. The foregoing background and summary are not intended to provide any independent limitations on the claimed invention.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

The following description refers to the accompanying drawings in which, in the absence of a contrary representation, the same numbers in different drawings represent similar elements. The implementations in the following description do not represent all implementations consistent with principles of the claimed invention. Instead, they are merely some examples of systems and methods consistent with those principles. It is to be understood that both the foregoing general description and the following detailed description are exemplary and explanatory only and are not restrictive of the invention, as claimed.

Figure 2:
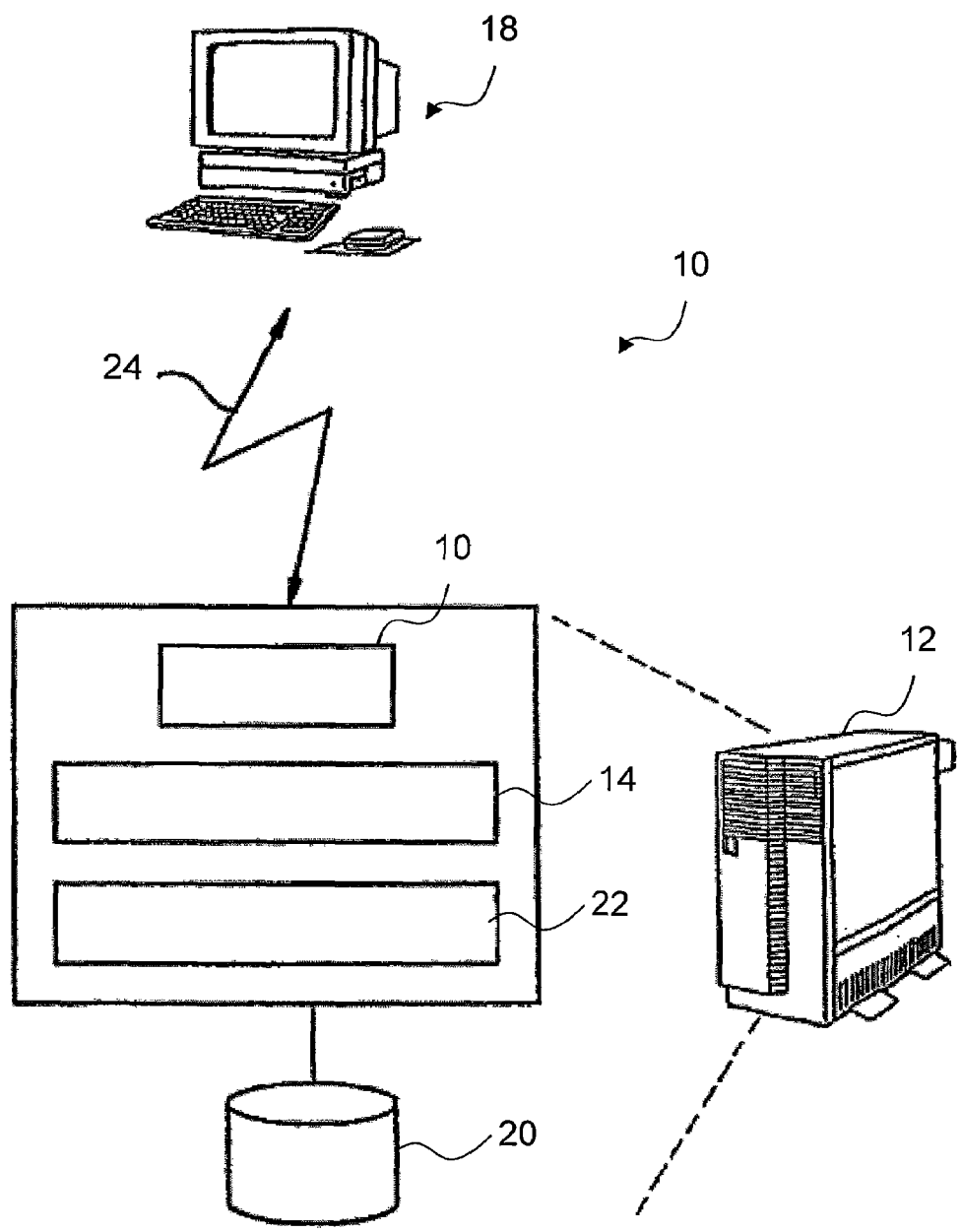
FIG. 2 is a schematic block diagram of a client-server system according to the invention.

The invention is illustrated by means of one possible embodiment in which a client-server system 10 comprises a client computer 18 and a server 12 (cf. FIG. 2). The server 12 further comprises a graphical user interface (GUI) generation module 16, a generator unit 14 as well as a database interface unit 22. The client 18 is interconnected with the server 12 by means of a connection line 24 which could be, for example, the Internet. A database 20 containing a set of archived data is interconnected with the server 12 via database interface unit 22.

Figure 1:
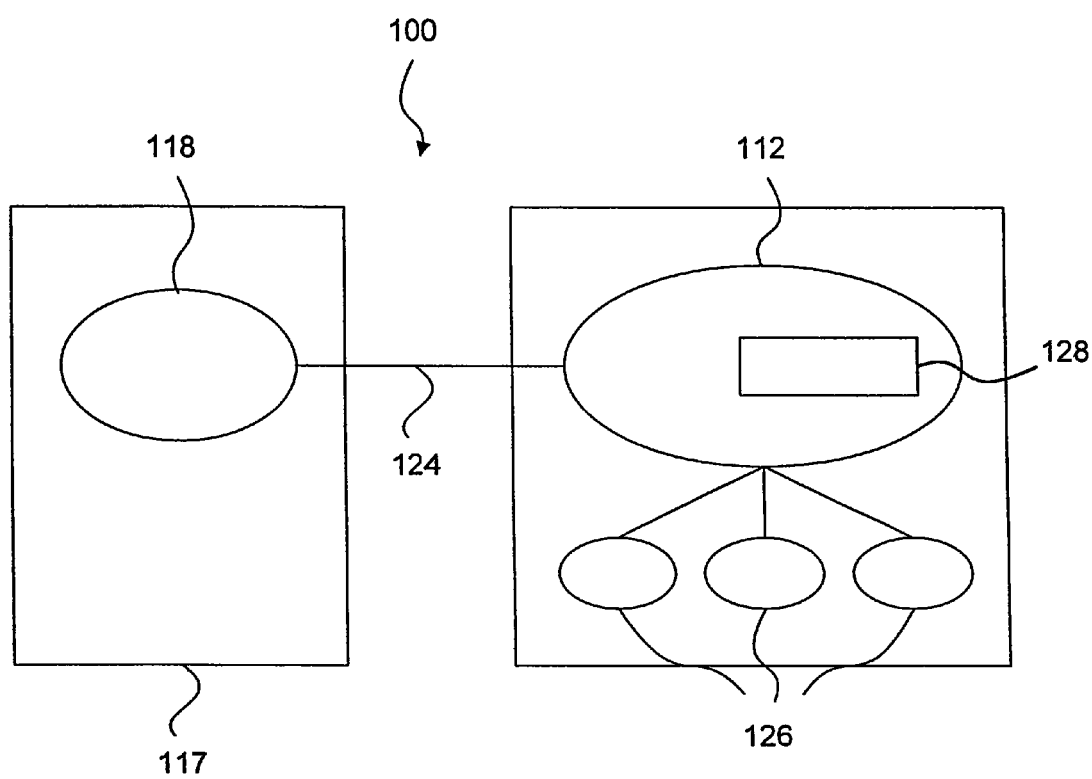
FIG. 1 illustrates a graphical user interface implementation based on a client-server arrangement.

The client-server system 10 is set up to provide one or more applications to the client 18 via the server 12. As already outlined above in connection with FIG. 1, the server 12 communicates with one or more applications via an application programming interface API (not shown) in order to execute any commands from the client 18 and return results subsequently to the client 18.

Further, the system is set up in such a manner that a user of the client computer 18 is able to custom design its user interface UI which in a lot of cases today is a GUI. If the application requires to retrieve data from the database 20 the custom design or custom set-up of the GUI will comprise the possibility of creating a customized search mask containing the search data fields of interest to the user.

Figure 3:
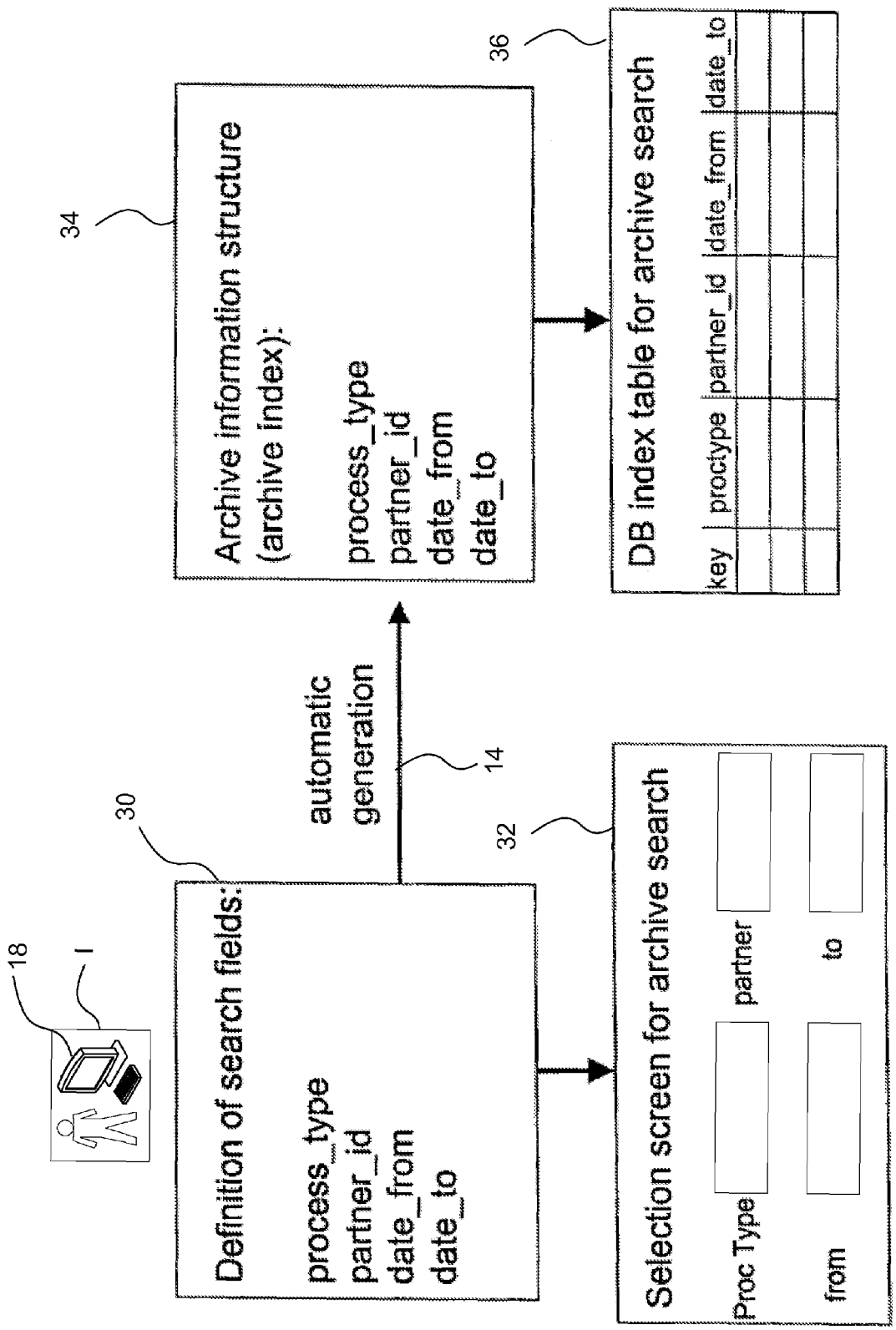
FIG. 3 is a schematic block diagram illustrating a linking procedure according to the invention for automatically generating an archive index.

A possible embodiment of such a customizing process is illustrated by the block diagram depicted in FIG. 3.

An icon I depicts a user in front of the client computer 18, selecting search fields from a proposed variety of selectable search data fields as is illustrated at 30 and 32. At 30, a list of data fields selected by the user are shown, namely process_type, partner_id, date_from and date_to. This custom selection can be performed for example via an appropriate transaction which is a layout of selectable data fields (such as the SAP CRMC_BLUEPRINT transaction). This selection is transferred into a customized screen (search mask) for an archive search in order to retrieve data from the set of archive data in database 20. This screen with four fill-in fields is shown at 32.

Further, an automatic generation is effected by generator unit 14, resulting in the automatic generation of an archive index structure based on the customized set-up as defined in 30, i.e. corresponding to the data fields selected by the user, which in the example shown in FIG. 3 are the four fields process_type, partner_id, date_from and date_to, thus creating a database index table 36 with an allocated key indication for data retrieval.

The automatic generation as performed by the generator unit 14 can be effected by means of a linking procedure between the selected fields 30 and the whole of the variety of the indexable archive fields in order to determine whether each of the selected fields is a field for data retrieval by means of archive search. For any selected field fulfilling the requirement(s) an according field in the archive index 34 is then generated. As can be understood by the illustration in FIG. 3, all four of the fields selected at 30 fulfill the requirement(s), i.e. they are fields for data retrieval, resulting in the generation of the archive index structure at 34 containing four corresponding archive fields.

Thus, a search by using the custom design search mask screen 32 can be effected without experiencing inconsistency and/or performance problems.

As will be understood by any person skilled in the art, the principles according to the invention described hereinabove with reference to the possible embodiment illustrated in the Figures of course also apply to a reverse automatic generation. In this reverse case (which is not illustrated) a user first selects the archive objects or fields of interest to him (i.e. he first creates a custom archive index structure) followed by an automatic generation of a corresponding search field list and according selection screen mask (which could be described with reference to FIG. 3 as turning around the arrow 14 which depicts the action of the generator unit according to the invention).

In a possible embodiment, the automatic generation is triggered every time a change to the initial custom selection (be it the selection of the search data fields or be it the selection of the archive object fields) occurs. In another possible embodiment, the automatic generation is triggered every time a change to any of the two lists or tables occurs, resulting in a two-fold generation in the one or in the other direction, depending on the table at which a change occurred.

The invention thus provides for an automated method to create a direct relationship between the customizing of the UI side and the archive index.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for setting up a customizable client-server system, comprising:
   receiving a user input for custom selecting one of (i) search data fields from a proposed variety of selectable search data fields in order to create a user interface search mask and (ii) archive fields from a proposed variety of selectable archive fields of an archive database;

automatically linking, via a processor, the fields selected during said step of custom selecting and the respective other one of the two varieties of selectable fields in order to identify and automatically generate a list of corresponding respective fields, wherein the linking includes determining whether the selected fields can be used to search the archive database; and automatically generating, via the processor, an archive index corresponding to at least one of the automatically-linked fields, including an archive field from the archive database, wherein the archive index allows the user to quickly search the archive database when searching based on fields selected in the step of custom selecting, wherein a two-fold generation by the processor is triggered by a change to the custom selection, including recreating the user interface search mask when the change is to the archive fields, and automatically regenerating the archive index when the change is to the search data fields.

2. The method according to claim 1, wherein a search data field within the list of corresponding respective fields is displayed on the user interface search mask.

3. The method according to claim 2, wherein a plurality of clients are interconnected with said server.

4. The method according to claim 1, wherein the method further comprises creating a database index table with an allocated key indication for data retrieval.

5. A method for generating a user interface set-up for archive data retrieval in a client-server system, comprising:

receiving a customized selection of archive index fields, including an archive field from an archive database;

automatically generating, via a processor, of a corresponding a selectable search field list;

automatically linking, via the processor, one of the selected archive index fields to a selectable search field in the selectable search field list;

automatically generating an archive index structure including the customized selection of archive index fields; and creating, via the processor, a user interface screen set-up corresponding to said selection of archive index structure fields, the user interface containing the selectable search field, wherein a two-fold generation is triggered by a change to at least one of the archive index fields and selectable search fields, wherein changing the selectable search fields triggers automatically generating the archive index, and changing the archive index fields triggers automatically generating the corresponding selectable search field list.

6. The method according to claim 5, wherein the method comprises creating, via a processor, a database index table with an allocated key indication for data retrieval.

7. A client-server system comprising:

a server;

a client device interconnected with said server and being set up to use an application provided by said server, the client including a display screen; and a database interconnected with said server and containing a structured set of data; and a generator unit that automatically generates, via a processor, an archive index structure based on a customized set-up of said application as defined on said client, the automatically generated archive index structure corresponding to a search data field, the search returning a result that is presented in the display screen, wherein the archive index structure includes at least one database field contained in the database, and wherein a two-fold generation by the processor is triggered by a change to at least one of the archive index structure and the selected data field, wherein changing the selected data field triggers automatically generating the archive index, and changing the archive index structure triggers automatically generating a corresponding selectable search field list.

8. The client-server system according to claim 7, wherein said customized set-up is a definition of search data fields.

9. A client-server system according to claim 8, wherein a plurality of clients are interconnected with said server.

10. A client-server system according to claim 7, wherein the customized set-up is defined via a user interface.

11. The client-server system according to claim 7, wherein said generator unit is located in said server.

12. The client-server system according to claim 7, wherein the network of the client-server system is the worldwide web.

13. A method to customize a network-based user application, comprising:

on a client, receiving a selection of data fields out of a variety of data fields offered for selection in order to create a customized set-up;

on a server, automatically generating, via a first processor, an archive index structure based on said customized set-up, the archive index structure corresponding to a selected data field in the customized set-up; and on a database interconnected with said server, executing, via a second processor, a search that is initiated by a user on said client using the customized set-up, the search using the automatically generated archive index structure to locate data in the database for presentation to a user of the client, wherein the archive index structure includes at least one database field contained in the database, wherein a two-fold generation by at least one of the first and second processors is triggered by a change to at least one of the archive index structure and the selected data field, wherein changing the selected data field triggers automatically generating the archive index, and changing the archive index structure triggers automatically generating a corresponding selectable search field list.

14. The method according to claim 13, wherein the archive index structure comprises a database index table with an allocated key indication for data retrieval.

15. A method according to claim 13, wherein the automatic generation is effected by means of a linking procedure between the selected fields and the whole of the variety of selectable data fields in order to determine whether each of the selected fields is a field for data retrieval, wherein for each selected field fulfilling said requirement, an according field in the archive index is then generated.

16. A method to customize a network-based user application, comprising:

on a client, selecting data fields out of a variety of data fields offered for selection in order to create a customized archive index structure;

on a server, automatically generating, via a first processor, a customized user interface set-up based on said archive index structure, the archive index structure corresponding to a selected data field in the customized set-up and containing at least one according archive field; and on a database interconnected with said server, executing, via a second processor, a search that is initiated by a user on said client using the automatically generated customized application set-up, the search using the generated archive index structure to retrieve data in the database for display on the client, wherein a two-fold generation by at least one of the first and second processors is triggered by a change to at least one of the archive index structure and the selected data field, wherein changing the selected data field triggers automatically generating the archive index, and changing the archive index structure triggers automatically generating a corresponding selectable search field list.

17. The method according to claim 16, wherein the archive index structure comprises a database index table with an allocated key indication for data retrieval.

18. A computer-readable storage medium storing instructions for execution by a processor for setting up a customizable client-server system, the instructions, when executed by the processor, performing steps comprising:

receiving user input for custom selecting one of (i) search data fields for use in an archive search from a proposed variety of selectable search data fields in order to create a user interface search mask and (ii) archive fields from a proposed variety of selectable archive fields of an archive database;

automatically linking, via the processor, (a) the fields selected during said step of custom selecting from one of the two varieties of selectable fields, with (b) the whole of the variety of the respective other one of the two varieties of selectable fields in order to identify and automatically generate a list of corresponding respective fields of the other one of the two varieties;

storing the generated list of corresponding respective fields in a memory for access during a search of the archive database; and triggering a two-fold generation by the processor upon detecting a change to the custom selection, wherein changing the selected data fields triggers automatically generating the archive index, and changing the selected archive fields triggers automatically generating a corresponding selectable search field list.

19. The computer-readable storage medium according to claim 18, wherein the method further comprises creating a database index table with an allocated key indication for data retrieval.

20. A computer-readable storage medium on which is stored a set of instructions for carrying out, when executed on a computer, a method for generating an archive index structure for archive data retrieval in a client-server system, the method comprising:

receiving user input for a custom selection of search data fields to use in an archive search;

automatically linking, via a processor, the custom selected search data fields to at least one archive field;

creating, via the processor, an archive index structure corresponding to the search data field and containing the at least one according archive field, the archive index structure being used for retrieving the archive data during the search; and triggering a two-fold generation by the processor upon detecting a change to at least one of the archive index structure and the selected search data fields, wherein changing the selected search data fields triggers automatically generating the archive index, and changing the archive index structure triggers automatically generating a corresponding selectable search field list.

21. The computer-readable storage medium according to claim 20, wherein the method further comprises creating a database index table with an allocated key indication for data retrieval.

* * * * *

UNITED STATES PATENT AND TRADEMARK OFFICE
CERTIFICATE OF CORRECTION

| | | |
|---|---|---|
| PATENT NO. | : 7,603,394 B2 | Page 1 of 1 |
| APPLICATION NO. | : 11/016095 | |
| DATED | : October 13, 2009 | |
| INVENTOR(S) | : Steinmaier et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 341 days.

Signed and Sealed this

Fifth Day of October, 2010

David J. Kappos
*Director of the United States Patent and Trademark Office*